(12) United States Patent
Keledjian et al.

(10) Patent No.: US 8,513,339 B1
(45) Date of Patent: Aug. 20, 2013

(54) COPOLYMERIZABLE SULFUR-CONTAINING ADHESION PROMOTERS AND COMPOSITIONS THEREOF

(75) Inventors: Raquel Keledjian, Glendale, CA (US); Renhe Lin, Stevenson Ranch, CA (US); Bruce Vimelson, Valencia, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 13/529,183

(22) Filed: Jun. 21, 2012

(51) Int. Cl.
*C08K 5/37* (2006.01)

(52) U.S. Cl.
USPC ............ 524/80; 524/373; 524/374; 524/375; 524/378

(58) Field of Classification Search
USPC ............................ 524/80; 528/373–375, 378
See application file for complete search history.

(56) References Cited

U.S. PATENT DOCUMENTS

| | | |
|---|---|---|
| 4,366,307 A | 12/1982 | Singh et al. |
| 4,609,762 A | 9/1986 | Morris et al. |
| 4,623,711 A | 11/1986 | Morris et al. |
| 5,225,472 A | 7/1993 | Cameron et al. |
| 6,172,179 B1 | 1/2001 | Zook et al. |
| 2005/0010003 A1 | 1/2005 | Sawant et al. |
| 2006/0270796 A1 | 11/2006 | Sawant et al. |
| 2007/0287810 A1 | 12/2007 | Rao et al. |
| 2009/0326167 A1 | 12/2009 | Sawant et al. |
| 2010/0010133 A1 | 1/2010 | Zook et al. |
| 2010/0036063 A1 | 2/2010 | Sawant et al. |
| 2010/0041839 A1 | 2/2010 | Anderson et al. |
| 2011/0319559 A1 | 12/2011 | Kania et al. |
| 2012/0040103 A1 * | 2/2012 | Keledjian et al. ............. 427/515 |
| 2012/0040104 A1 | 2/2012 | Keledjian et al. |

OTHER PUBLICATIONS

Mather et al., "Michael Addition Reactions in Macromolecular Design for Emerging Technologies" Prog. Polym. Sci., 2006, 31, pp. 487-531.

* cited by examiner

*Primary Examiner* — Peter Szekely
(74) *Attorney, Agent, or Firm* — William Lambert

(57) ABSTRACT

Disclosed are sulfur-containing polymers containing copolymerizable adhesion promoters and compositions including sealant compositions useful in aerospace applications comprising sulfur-containing polymers containing copolymerizable adhesion promoters. In particular, polythioethers and polysulfides incorporating copolymerizable adhesion promoters are disclosed.

20 Claims, No Drawings

COPOLYMERIZABLE SULFUR-CONTAINING ADHESION PROMOTERS AND COMPOSITIONS THEREOF

FIELD

The present disclosure relates to polymers in which adhesion promoters are copolymerized to a sulfur-containing polymer backbone and to compositions comprising the copolymerizable adhesion promoters that exhibit improved surface adhesion. Sulfur-containing polymers incorporating copolymerizable adhesion promoters and compositions thereof are disclosed.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. Adhesion promoters are typically added to sealant formulations to enhance adhesion of the various components to each other and to the surfaces to which the sealant is applied. Ways to provide improved adhesion while maintaining other advantageous properties of a sealant are continuously desired.

Sulfur-containing polymers such as polythioethers and polysulfides are useful in aerospace applications. Examples of polythioethers and polysulfides are disclosed, for example, in U.S. Publication Nos. 2005/0010003, 2006/0270796, 2007/0287810, 2009/0326167, and 2010/036063.

SUMMARY

Copolymerizing adhesion promoters directly to a sulfur-containing polymer backbone ensures that the adhesion promoters are strongly coupled to the polymer network, which forms the structure of a cured sealant. Sulfur-containing polymers comprising copolymerizable adhesion promoters and compositions comprising such polymers are also disclosed.

In a first aspect, sulfur-containing compounds are provided having the structure of Formula (1):

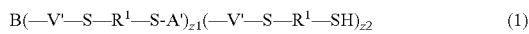

$$B(-V'-S-R^1-S-A')_{z1}(-V'-S-R^1-SH)_{z2} \quad (1)$$

wherein
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;
wherein:
each $R^3$ is independently selected from hydrogen and methyl;
each X is independently selected from $-O-$, $-S-$, and $-NR-$
wherein R is selected from hydrogen and methyl;
s is an integer from 2 to 6;
q is an integer from 1 to 5; and
r is an integer from 2 to 10;
each A' independently represents a moiety formed by the reaction of a compound A with a thiol group, wherein compound A is a compound having a terminal group that is reactive with a thiol group and a terminal group that promotes adhesion;
B represents a core of a z-valent, alkenyl-terminated polyfunctional compound $B(-V)_z$,
wherein:
z is the sum of z1 and z2, and z is an integer from 3 to 6;
z1 is an integer from 1 to 4;
z2 is an integer from 2 to 5; and
each $-V$ is a moiety comprising a terminal group that is reactive with a thiol group; and
each $-V'-$ represents a moiety formed by the reaction of $-V$ with a thiol group.

In a second aspect, sulfur-containing compounds are provided comprising the reaction product of reactants comprising: (a) a polyfunctional compound having terminal groups that are reactive with thiol groups; (b) a dithiol; and (c) a compound having a terminal group that is reactive with a thiol group and a terminal group that promotes adhesion.

In a third aspect, compositions are provided comprising: (a) at least one sulfur-containing compound provided by the present disclosure; (b) at least one thiol-terminated sulfur-containing polymer; and (c) at least one curing agent.

In a fourth aspect, sealants comprising at least one sulfur-containing compound provided by the present disclosure are provided.

In a fifth aspect, apertures sealed with a sealant comprising at least one sulfur-containing compound provided by the present disclosure are provided.

In a sixth aspect, methods of sealing an aperture are provided comprising: (a) applying a sealant comprising at least one sulfur-containing compound provided by the present disclosure to at least one surface defining an aperture; (b) assembling the surfaces defining the aperture; and (c) curing the sealant to provide the cured aperture.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the embodiments provided by the present disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("—") that is not between two letters or symbols is used to indicate a point of bonding for a substituent or between two atoms. For example, —CONH$_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). It can be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" group refers to a group (R)$_2$C=C(R)$_2$ or —RC=C(R)$_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=CH$_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It can be appreciated that a branched alkyl group has a minimum of three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

A "Michael acceptor" refers to an activated alkene, such as an alkenyl group proximate to an electron-withdrawing group such as a ketone, nitro, halo, nitrile, carbonyl, or nitro group. Michael acceptors are well known in the art. A "Michael acceptor group" refers to an activated alkenyl group and an electron-withdrawing group. In certain embodiments, a Michael acceptor group is selected from a vinyl ketone, a vinyl sulfone, a quinone, an enamine, a ketimine, an aldimine, an oxazolidine, and an acrylate. Other examples of Michael acceptors are disclosed in Mather et al., *Prog. Polym. Sci.*, 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor group is derived from a vinyl ketone and has the structure of the formula —S(O)$_2$—C(R)$_2$=CH$_2$, where each R is independently selected from hydrogen, fluorine, and $C_{1-3}$ alkyl. In certain embodiments, each R is hydrogen. In certain embodiments, a Michael acceptor or Michael acceptor group does not encompass acrylates. A "Michael acceptor compound" refers to a compound comprising at least one Michael acceptor. In certain embodiments, a Michael acceptor compound is divinyl sulfone, and a Michael acceptor group is vinylsulfonyl, e.g., —S(O)$_2$—CH$_2$=CH$_2$.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

Reference is now made to certain embodiments of sulfur-containing compounds, adhesion promoters, polymers, compositions, and methods. The disclosed embodiments are not intended to be limiting of the claims. To the contrary, the claims are intended to cover all alternatives, modifications, and equivalents.

Sulfur-Containing Adhesion Promoters

Copolymerizing adhesion promoters directly to a sulfur-containing polymer backbone can improve the adhesion of a composition such as a sealant composition. It will be appreciated that the general concept can be applied to any adhesion promoter and to any polymer.

In certain embodiments, adhesion promoters provided by the present disclosure are copolymerized to the backbone of a sulfur-containing polymer such as a thiol-terminated sulfur-containing polymer, including, for example, thiol-terminated polythioethers and thiol-terminated polysulfides.

In certain embodiments, an adhesion promoter is copolymerized to a thiol-terminated polythioether polymer. Examples of thiol-functional polythioethers are disclosed, for example, in U.S. Pat. No. 6,172,179. In certain embodiments, a thiol-functional polythioether comprises Permapol® P3.1E, available from PRC-DeSoto International Inc., Sylmar, Calif.

In certain embodiments, an adhesion promoter is copolymerized to a polysulfide polymer. In certain embodiments, a polysulfide polymer can be any of the polymers disclosed, for example, in U.S. Pat. No. 4,623,711.

In certain embodiments, an adhesion promoter useful for copolymerizing to a polymer backbone comprises a sulfur-containing compound having the structure of Formula (1):

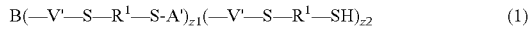

$$B(-V'-S-R^1-S-A')_{z1}(-V'-S-R^1-SH)_{z2} \quad (1)$$

wherein
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X—]$_q$—(CHR$^3$)$_r$—;
wherein:
each $R^3$ is independently selected from hydrogen and methyl;
each X is independently selected from —O—, —S—, and —NR—
wherein R is selected from hydrogen and methyl;
s is an integer from 2 to 6;
q is an integer from 1 to 5; and
r is an integer from 2 to 10;
each A' independently represents a moiety formed by the reaction of a compound A with a thiol group, wherein compound A is a compound having a terminal group that is reactive with a thiol group and a terminal group that promotes adhesion;
B represents a core of a z-valent, alkenyl-terminated polyfunctional compound B(—V)$_z$,
wherein:
z is the sum of z1 and z2, and z is an integer from 3 to 6;
z1 is an integer from 1 to 4;
z2 is an integer from 2 to 5; and
each —V is a moiety comprising a terminal group that is reactive with a thiol group; and
each —V'— represents a moiety formed by the reaction of —V with a thiol group.

Compounds of Formula (1) comprise at least one terminal adhesion promoter moiety and at least two terminal thiol groups. The at least one adhesion promoter moiety provides adhesion to a surface and/or other constituent of a formulation of which it is a part, and the terminal thiol-groups react with a curing agent to form a polymer network. Thus, in compounds of Formula (1), z2 is at least 2, and in certain embodiments, z2 is 2, 3, 4, and in certain embodiments z2 is 5. In certain embodiments of compounds of Formula (1), z1 is 1, 2, 3, and in certain embodiments, z1 is 4. In certain embodiments, a compound of Formula (1) is trivalent, such that z is 3, in certain embodiments, a compound of Formula (1) is tetravalent such that z is 4, and in certain embodiments, z is 5, and in certain embodiments, z is 6.

In certain embodiments, $R^1$ is selected from $C_{2-6}$ alkanediyl and —[—(CHR$^3$)$_s$—X—]$_q$—(CHR$^3$)$_r$—.

In certain embodiments, $R^1$ is —[—(CHR$^3$)$_s$—X—]$_q$—(CHR$^3$)$_r$—, and in certain embodiments X is —O— and in certain embodiments, X is —S—.

In certain embodiments where $R^1$ is —[—(CHR$^3$)$_s$—X—]$_q$—(CHR$^3$)$_r$—, p is 2, r is 2, q is 1, and X is —S—; in certain embodiments, p is 2, q is 2, r is 2, and X is —O—; and in certain embodiments, p is 2, r is 2, q is 1, and X is —O—.

In certain embodiments where $R^1$ is —[—(CHR$^3$)$_s$—X—]$_q$—(CHR$^3$)$_r$—, each $R^3$ is hydrogen, and in certain embodiments, at least one $R^3$ is methyl.

In certain embodiments of a compound of Formula (1), each $R^1$ is the same, and in certain embodiments, at least one $R^1$ is different.

In certain embodiments of a compound of Formula (1), the terminal group that is reactive with a thiol group in compound A is selected from an alkenyl group, an isocyanate group, an epoxy group, and a Michael acceptor group. In certain embodiments of a compound of Formula (1), the terminal group that is reactive with a thiol group in compound A is an alkenyl group, an isocyanate group, an epoxy group, and in certain embodiments, a Michael acceptor group.

In certain embodiments of a compound of Formula (1), a terminal group that promotes adhesion is selected from a silane, a phosphonate, an amine, a carboxylic acid, and a phosphonic acid. In certain embodiments of a compound of Formula (1), a terminal group that promotes adhesion is a silane group, a phosphonate group, an amine group, a carboxylic acid group, and in certain embodiments, a phosphonic acid group.

—V is a moiety comprising a terminal group that is reactive with a thiol group. For example, in certain embodiments, —V is —R$^{10}$—CH═CH$_2$, wherein R$^{10}$ is selected from $C_{1-6}$ alkanediyl, substituted $C_{1-6}$ alkanediyl, $C_{1-6}$ heteroalkanediyl, and substituted $C_{1-6}$ heteroalkanediyl. However, the structure of —V is not limited. In certain embodiments, each —V may be the same, and in certain embodiments, at least one —V may be different.

Each A' independently represents a moiety formed by the reaction of a compound A with a thiol group, wherein compound A is a compound having a terminal group that is reactive with a thiol group and a terminal group that promotes adhesion. As indicated above, groups that are reactive with thiol groups include alkenyl groups, isocyanate groups, epoxy groups, and Michael acceptor groups. Groups that promote adhesion are well-known in the art. Examples of groups that promote adhesion include silane groups, phosphonate groups, amine groups, including primary and secondary amines, carboxylic acid groups, and phosphonic acid groups.

In compounds of Formula (1), each A' may be the same or, in certain embodiments, at least one A' may be different. For example, in certain embodiments, each A' may comprise the same adhesion promoting group, and in certain embodiments, at least one of the adhesion promoting groups may be different.

In certain embodiments, an adhesion promoting group may be a silane group, which may have the structure $-Si(R^4)_{y1}(OR^5)_{y2}$ wherein y1 is selected from 0, 1, and 2; y2 is selected from 1, 2, and 3; and the sum of y1 and y2 is 3; each $R^4$ is independently selected from $C_{1-4}$ alkyl; and each $R^5$ is independently selected from $C_{1-4}$ alkyl.

In certain embodiments, an adhesion promoting group may be a phosphonate group, which may have the structure $-P(=O)(OR^6)_2$ wherein each $R^6$ is independently selected from $C_{1-4}$ alkyl. In certain embodiments, an adhesion promoting group may be a phosphonic acid group, which has the structure $-P(=O)(OR^6)_2$ wherein each $R^6$ is hydrogen.

In certain embodiments, an adhesion promoting group may be a primary amine, and in certain embodiments, a secondary amine.

In certain embodiments, an adhesion promoting group may be a carboxylic acid group.

In certain embodiments of A in which a terminal group that is reactive with a thiol group is an alkenyl group, A is selected from (a) a compound of Formula (2):

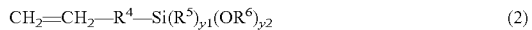

(2)

wherein
y1 is selected from 0, 1, and 2; y2 is selected from 1, 2, and 3; wherein the sum of y1 and y2 is 3;
$R^4$ is selected from a covalent bond and $C_{1-6}$ alkanediyl;
each $R^5$ is independently selected from $C_{1-4}$ alkyl; and
each $R^6$ is independently selected from $C_{1-4}$ alkyl;

(b) a compound of Formula (3):

(3)

wherein
$R^7$ is selected from a covalent bond and $C_{1-6}$ alkanediyl; and
each $R^8$ is independently selected from hydrogen and $C_{1-4}$ alkyl;

(c) a compound of Formula (4):

(4)

wherein $R^9$ is selected from $C_{1-10}$ alkanediyl, substituted $C_{1-10}$ alkanediyl, $C_{1-10}$ heteroalkanediyl, and substituted $C_{1-10}$ heteroalkanediyl; and (d) a compound of Formula (5):

(5)

wherein $R^{10}$ is $C_{1-6}$ alkanediyl.

In certain embodiments, a group that is reactive with a thiol group is a Michael acceptor group. In certain embodiments, a Michael acceptor group comprises a moiety in which an electron withdrawing group such as a ketone or a sulfone is proximate to a terminal alkenyl group. Examples of Michael acceptor groups include vinyl ketones, vinyl sulfones, quinones, enamines, aldimines, ketimines, and acrylates. Other examples of electron withdrawing groups include a hindered secondary amine group, a tertiary amine group, an aziridinyl group, a urea group, a carbamate group, a carbodiimide group, and a halogen group. Accordingly, in such embodiments, compound A comprises a Michael acceptor group and a group that promotes adhesion.

In certain embodiments of a compound of Formula (1), each -A' is the same and is selected from Formula (2a), Formula (3a), Formula (4a), and Formula (5a):

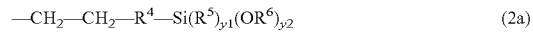

(2a)

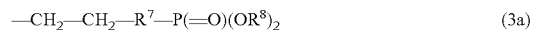

(3a)

(4a)

(5a)

where $R^4$, $R^5$, $R^6$, $R^7$, $R^8$, $R^9$, and $R^{10}$ are as defined for Formulae (2)-(5).

In certain embodiments of a compound of Formula (1), each -A' is the same and is a moiety of Formula (2a), a moiety of Formula (3a), a moiety of Formula (4a), and in certain embodiments, a moiety of Formula (5a).

In certain embodiments in which compound A comprises a Michael acceptor group, compound A comprises the reaction products of (a) a compound of the formula HS—$R^{10}$—S-D, wherein $R^{10}$ is selected from $C_{1-10}$ alkanediyl, substituted $C_{1-10}$ alkanediyl, $C_{1-10}$ heteroalkanediyl, and substituted $C_{1-10}$ heteroalkanediyl; and D comprises a terminal group that promotes adhesion; and (b) a compound having terminal Michael acceptor group and a terminal group that is reactive with a thiol group. In certain embodiments, a terminal Michael acceptor group is a vinyl sulfone and a terminal group that is reactive with a thiol group is selected from an alkenyl group and an epoxy group. In certain embodiments, compound A is divinyl sulfone.

In certain embodiments, a compound having a terminal Michael acceptor group and a terminal group that promotes adhesion has the formula $CH_2=S(O)_2-CH_2-S-R^{10}-S$-D. Such compounds may be reacted with a polythiol, such as a trithiol, a tetrathiol, a pentathiol, a hexathiol, or a combination of any of the foregoing. Polythiols can have the structure $B(-V)_z$ wherein each -V is a moiety having a terminal thiol group and z is an integer from 3 to 6. Examples of suitable polythiols are disclosed in U.S. Publication No. 2011/0319559.

In certain embodiments of a compound of Formula (1), each -A' is the same and is selected from Formula (2b), Formula (3b), Formula (4b), and Formula (5b):

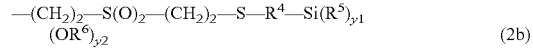

(2b)

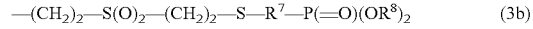

(3b)

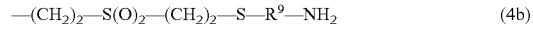

(4b)

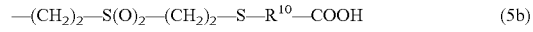

(5b)

where $R^4$, $R^5$, $R^6$, $R^7$, $R^8$, $R^9$, and $R^{10}$ are as defined for Formulae (2)-(5). In certain embodiments of a compound of Formula (1), each -A' is the same and is a moiety of Formula (2b), a moiety of Formula (3b), a moiety of Formula (4b), and in certain embodiments, a moiety of Formula (5b).

B represents a core of a z-valent, polyfunctional compound $B(-V)_z$, where z is an integer from 3 to 6. In certain embodiments, z is 3, z is 4, z is 5, and in certain embodiments z is 6. In certain embodiments, a polyfunctional compound is tri-functional. In certain embodiments, a polyfunctional compounds is triallyl cyanurate (TAC) where B has the structure:

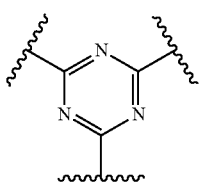 [SMILES: *c1nc(*)nc(*)n1]

and each —V has the structure —O—CH$_2$—CH=CH$_2$.

In certain embodiments, polyfunctional compound B(—V)$_z$ has a molecular weight less than 800 Daltons, less than 600 Daltons, less than 400 Daltons and in certain embodiments, less than 200 Daltons. Polyfunctional compounds B(—V)$_z$ in which z is at least 3 may be any of the polyfunctionalizing agents useful in polymer chemistry. Polyfunctionalizing agents having mixed functionality, i.e., agents that include moieties (typically separate moieties), that react with both thiol and vinyl groups, may also be employed. Other useful polyfunctionalizing agents include trimethylolpropane trivinyl ether, and the polythiols described in U.S. Pat. No. 4,366,307, U.S. Pat. No. 4,609,762, and U.S. Pat. No. 5,225,472, each of which is incorporated by reference in its entirety. Combinations of polyfunctionalizing agents having the same terminal groups such as thiol groups or allyl groups may also be used.

Each —V is a moiety comprising a terminal group that is reactive with a thiol group such as, for example, an alkenyl group, an epoxy group, or a Michael acceptor group. In certain embodiments, each —V is the same, and in certain embodiments, at least one —V is different. In certain embodiments, —V is selected from C$_{3-8}$ alkene-1-yl and C$_{3-8}$ heteroalkene-1-yl, where the one or more hetero groups is selected from —O— and —S—.

Each —V'— represents a moiety formed by the reaction of a moiety —V with a thiol group. In certain embodiments, —V comprises a terminal alkenyl group selected from C$_{3-8}$ alkene-1-yl and C$_{3-8}$ heteroalkene-1-yl, and V' is selected from C$_{3-8}$ alkanediyl and C$_{3-8}$ heteroalkanediyl.

Reaction Product

In certain embodiments, a sulfur-containing adhesion promoter comprises the reaction products of reactants comprising: (a) a polyfunctional sulfur-containing compound having terminal groups that are reactive with thiol groups; (b) a dithiol; and (c) a compound having a terminal group that is reactive with a thiol group and a terminal second group that promotes adhesion. In certain embodiments of the reaction, the reaction products comprise one or more compounds of Formula (1).

In certain embodiments, a polyfunctional compound having terminal groups reactive with thiol groups has the structure B(—V)$_z$ where z is an integer from 3 to 6, and B and —V are as defined herein.

In certain embodiments of B(—V)$_z$, each —V comprises a terminal alkenyl group.

In certain embodiments, a dithiol has the structure of Formula (6):

HS—R$^1$—SH    (6)

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—;

wherein:
each R$^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments, R$^1$ is —[—(CHR$^3$)$_s$—X—]$_q$—(CHR$^3$)$_r$—.

In certain embodiments of a compound of Formula (6), X is selected from —O— and —S—, and thus —[—(CHR$^3$)$_s$—X—]$_q$—(CHR$^3$)$_r$— in Formula (6) is —[(—CH$_2$—)$_p$—O—]$_q$—(CH$_2$)$_r$— or —[(—CH$_2$—)$_p$—S—]$_q$—(CH$_2$)$_r$—. In certain embodiments, p and r are equal, such as where p and r are both two.

In certain embodiments, R$^1$ is selected from C$_{2-6}$ alkanediyl and —[—(CHR$^3$)$_s$—X—]$_q$—(CHR$^3$)$_r$—.

In certain embodiments, R$^1$ is —[—(CHR$^3$)$_s$—X—]$_q$—(CHR$^3$)$_r$—, and in certain embodiments X is —O—, and in certain embodiments, X is —S—.

In certain embodiments, where R$^1$ is —[—(CHR$^3$)$_s$—X—]$_q$—(CHR$^3$)$_r$—, p is 2, r is 2, q is 1, and X is —S—; in certain embodiments, p is 2, q is 2, r is 2, and X is —O—; and in certain embodiments, p is 2, r is 2, q is 1, and X is —O—.

In certain embodiments, where R$^1$ is —[—(CHR$^3$)$_s$—X—]$_q$—(CHR$^3$)$_r$—, each R$^3$ is hydrogen, and in certain embodiments, at least one R$^3$ is methyl.

In certain embodiments of a compound of Formula (1), each R$^1$ is the same, and in certain embodiments, at least one R$^1$ is different.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxyl group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (6), R$^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (6), R$^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (6), R$^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

In certain embodiments of a compound having a terminal group that is reactive with a thiol group and a terminal group that promotes adhesion, the terminal group that is reactive with a thiol group is selected from an alkenyl group, an isocyanate group, an epoxy group, and a Michael acceptor group; and the terminal group that promotes adhesion is selected from a silane, a phosphonate, an amine, a carboxylic acid, and a phosphonic acid.

In certain embodiments, a compound having a first group that is reactive with a thiol group and a second group that promotes adhesion is a vinyl silane. In certain embodiments, a vinyl silane has the structure of Formula (2):

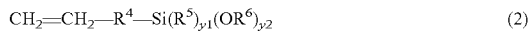

wherein
y1 is selected from 0, 1, and 2; y2 is selected from 1, 2, and 3; wherein the sum of y1 and y2 is 3;
$R^4$ is selected from a covalent bond and $C_{1-6}$ alkanediyl;
each $R^5$ is independently selected from $C_{1-4}$ alkyl; and
each $R^6$ is independently selected from $C_{1-4}$ alkyl.

In certain embodiments, a vinyl silane is selected from trimethoxy(vinyl)silane, ethoxydimethoxy(vinyl)silane, diethoxy(methoxy)(vinyl)silane, triethoxy(vinyl)silane, and a combination of any of the foregoing.

In certain embodiments, a compound having a terminal group that is reactive with a thiol group and a terminal group that promotes adhesion is a vinyl phosphonate. In certain embodiments, a vinyl phosphonate has the structure of Formula (3):

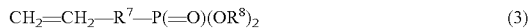

wherein
$R^7$ is selected from a covalent bond and $C_{1-6}$ alkanediyl; and
each $R^8$ is independently selected from hydrogen and $C_{1-4}$ alkyl.

In certain embodiments, a vinyl phosphonate is selected from vinylphosphonic acid, dimethyl vinylphosphonate, ethyl methyl vinylphosphonate, diethyl vinylphosphonate, and a combination of any of the foregoing.

In certain embodiments, that promotes adhesion compound having a terminal group that is reactive with a thiol group and a terminal group that promotes adhesion is a vinyl amine. In certain embodiments, a vinyl amine has the structure of Formula (4):

where $R^9$ is selected from $C_{1-10}$ alkanediyl, substituted $C_{1-10}$ alkanediyl, $C_{1-10}$ heteroalkanediyl, and substituted $C_{1-10}$ heteroalkanediyl.

In certain embodiments, a vinyl amine comprises the reaction products of reactants comprising a vinyl epoxide and a diamine. In certain embodiments, the vinyl epoxide has the structure of Formula (7):

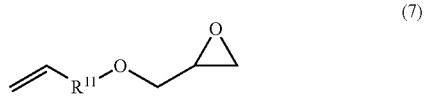

where $R^{11}$ is $C_{1-6}$ alkanediyl. In certain embodiments, a vinyl epoxide is allyl glycidyl ether. In certain embodiments, the diamine has the structure of Formula (8):

where $R^{12}$ is $C_{1-6}$ alkanediyl. In certain embodiments, a diamine is selected from N-(aminomethyl)methanediamine, $N^1$-(2-aminoethyl)ethane-1,2-diamine, and a combination thereof.

In certain embodiments, the compound having a terminal group that is reactive with a thiol group and a terminal group that promotes adhesion is a vinyl carboxylic acid and has the structure of Formula (5):

where $R^{10}$ is $C_{1-6}$ alkanediyl. In certain embodiments, a vinyl carboxylic acid is selected from but-3-enoic acid, pent-4-enoic acid, and hex-5-enoic acid.

In certain embodiments, the terminal group that is reactive with a thiol group is a Michael acceptor group; and the terminal group that promotes adhesion is selected from a silane, a phosphonate, an amine, a carboxylic acid, and a phosphonic acid. In certain embodiments, the compound may be prepared by reacting (a) a thiol-terminated compound of the formula HS—R—S-D, wherein R is selected from $C_{1-10}$ alkanediyl, substituted $C_{1-10}$ alkanediyl, $C_{1-10}$ heteroalkanediyl, and substituted $C_{1-10}$ heteroalkanediyl; and D comprises a group that promotes adhesion; with (b) a compound comprising a group that is reactive with a thiol group and a Michael acceptor group. In certain embodiments, a compound comprising a group that is reactive with a thiol group and a Michael acceptor group is a vinyl sulfone. In certain embodiments, a compound comprising a group that is reactive with a thiol group and a Michael acceptor group is divinyl sulfone.

In certain embodiments of a reaction to form a sulfur-containing compound, the polyfunctionalizing agent and the dithiol may be reacted to form a thiol-terminated intermediate. As such, the molar ratios of the reactants are appropriately selected. For example, one mole of a trifunctional compound such as TAC can be reacted with three moles of a dithiol such as DMDO to provide a trifunctional, thiol-terminated intermediate. A trifunctional, thiol-terminated intermediate may subsequently be reacted with a compound comprising a group that is reactive with a thiol group and a group that promotes adhesion. The molar ratio of the intermediate and a compound comprising a group that is reactive with a thiol group and a group that promotes adhesion may be selected to provide a polyfunctional compound having a desired average adhesion promoter functionality. For example, to obtain an average adhesion promoter functionality of about one, about one mole of polyfunctional intermediate is reacted with about one mole of a compound comprising a terminal group that is reactive with a thiol group and a terminal group that promotes adhesion.

In sulfur-containing compounds comprising adhesion promoting groups provided by the present disclosure it is intended that the compounds comprise at least one terminal group that promotes adhesion and at least two terminal thiol groups capable of reacting with a curing agent and thereby be incorporated into the backbone of the polymer network, e.g., copolymerized. In certain embodiments, the sulfur-containing compound comprises, on average, a single adhesion promoting group per molecule, and in certain embodiments, an average of two adhesion promoting groups per molecule.

In certain embodiments, a sulfur-containing adhesion promoter comprises the reaction products of reactants comprising TAC, DMDO, and a vinyl silane selected from trimethoxy(vinyl)silane, ethoxydimethoxy(vinyl)silane, diethoxy(methoxy)(vinyl)silane, and triethoxy(vinyl) silane.

In certain embodiments, a sulfur-containing adhesion promoter comprises the reaction products of reactants comprising TAC, DMDO, and a vinyl phosphonate selected from vinylphosphonic acid, dimethyl vinylphosphonate, ethyl methyl vinylphosphonate, and diethyl vinylphosphonate.

In certain embodiments, a sulfur-containing adhesion promoter comprises the reaction products of reactants comprising TAC, DMDO, and a diamine selected from N-(aminomethyl)methanediamine and $N^1$-(2-aminoethyl)ethane-1,2-diamine.

Compositions

Sulfur-containing adhesion promoters provided by the present disclosure may be used in compositions, such as compositions formulated as sealants useful in the aerospace industry.

In certain embodiments, compositions such as sealants provided by the present disclosure comprise (a) at least one sulfur-containing compound provided by the present disclosure; (b) at least one thiol-terminated sulfur-containing polymer; and (c) at least one curing agent.

In certain embodiments, a thiol-terminated sulfur-containing polymer is selected from a thiol-terminated polythioether, a thiol-terminated polysulfide, and a combination thereof.

In certain embodiments, a thiol-terminated sulfur-containing polymer comprises a thiol-terminated polythioether. A thiol-terminated polythioether may comprise a mixture of different polythioethers and the polythioethers may have the same or different functionality of thiol groups. In certain embodiments, a thiol-terminated polythioether has an average functionality from 2 to 6, from 2 to 4, from 2 to 3, and in certain embodiments, from 2.05 to 2.8. For example, a thiol-terminated polythioether may be selected from a difunctional sulfur-containing polymer, a trifunctional sulfur-containing polymer, and a combination thereof.

Examples of thiol-functional polythioethers are disclosed, for example in U.S. Pat. No. 6,172,179. In certain embodiments, a thiol-functional polythioether comprises Permapol® P3.1E available from PRC-DeSoto International Inc., Sylmar, Calif.

In certain embodiments, a thiol-terminated polythioether comprises (a) a backbone comprising a structure having the Formula (12):

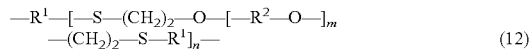

where (i) each $R^1$ is independently selected from a $C_{2-10}$ n-alkanediyl group, a $C_{3-6}$ branched alkanediyl group, a $C_{6-8}$ cycloalkanediyl e group, a $C_{6-10}$ alkanecycloalkanediyl group, a heterocyclic group, a $—[(—CH_2—)_p—X—]_q—(CH_2)_r—$ group, and a $—[(—CH_2—)_p—X—]_q—(CH_2)_r—$ group in which at least one $—CH_2—$ unit is substituted with a methyl group; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_p—X—]_q—(CH_2)_r—$ group; (iii) each X is independently selected from O, S, and a $—NR^6—$ group, in which $R^6$ is selected from hydrogen and a methyl group; (iv) m ranges from 0 to 50; (v) n is an integer from 1 to 60; (vi) p is an integer from 2 to 6; (vii) q is an integer from 1 to 5; and (viii) r is an integer from 2 to 10.

In certain embodiments, a thiol-terminated polythioether is selected from a thiol-terminated polythioether of Formula (13), a thiol-terminated polythioether of Formula (13a), and a combination thereof:

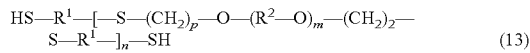

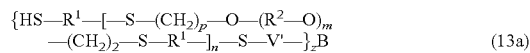

where:
each $R^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$, where:

s is an integer from 2 to 6;
q is an integer from 1 to 5;
r is an integer from 2 to 10;
each $R^3$ is independently selected from hydrogen and methyl; and
each X is independently selected from O, S, and $—NHR—$, where R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined above;

m is an integer from 0 to 50;
n is an integer from 1 to 60;
p is an integer from 2 to 6;
B represents a core of a z-valent, a polyfunctional compound $B(—V)_z$ wherein:
z is an integer from 3 to 6; and
each $—V$ is a moiety comprising a terminal group that is reactive with a thiol group; and
each $—V'—$ represents a moiety formed by the reaction of each $—V$ with a thiol group.

In certain embodiments, $R^1$ in Formula (13) and in Formula (13a) is $—[(—CH_2—)_p—X—]_q—(CH_2)_r—$, where p is 2, X is $—O—$, q is 2, r is 2, $R^2$ is ethanediyl, m is 2, and n is 9.

In certain embodiments of Formula (13) and Formula (13a), $R^1$ is selected from $C_{2-6}$ alkanediyl and $—[(CHR^3)_s—X—]_q—(CHR^3)_r—$.

In certain embodiments of Formula (13) and Formula (13a), $R^1$ is $—[(CHR^3)_s—X—]_q—(CHR^3)_r—$, and in certain embodiments X is $—O—$ and in certain embodiments, X is $—S—$.

In certain embodiments of Formula (13) and Formula (13a), where $R^1$ is $—[(CHR^3)_s—X—]_q—(CHR^3)_r—$, p is 2, r is 2, q is 1, and X is $—S—$; in certain embodiments, p is 2, q is 2, r is 2, and X is $—O—$; and in certain embodiments, p is 2, r is 2, q is 1, and X is $—O—$.

In certain embodiments of Formula (13) and Formula (13a), where $R^1$ is $—[—(CHR^3)_s—X—]_q—(CHR^3)_r—$, each $R^3$ is hydrogen, and in certain embodiments, at least one $R^3$ is methyl.

In certain embodiments of compounds of Formula (13) and Formula (13a), each $R^1$ is the same, and in certain embodiments, at least one $R^1$ is different.

Various methods can be used to prepare such polythioethers. Examples of suitable thiol-functional polythioethers, and methods for their production, which are suitable for use in compositions disclosed herein, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-functional polythioethers may be difunctional, that is, linear polymers having two thiol end groups, or polyfunctional, that is, branched polymers have three or more thiol end groups. Suitable thiol-functional polythioethers are commercially available, for example, as Permapol® P3.1E from PRC-DeSoto International Inc., Sylmar, Calif.

Suitable thiol-functional polythioethers may be produced by reacting a divinyl ether or mixtures of divinyl ethers with an excess of dithiol or a mixtures of dithiols. For example, dithiols suitable for use in preparing such thiol-functional polythioethers include those having Formula (6), other dithiols disclosed herein, or combinations of any of the dithiols disclosed herein.

Suitable divinyl ethers include, for example, divinyl ethers have Formula (14):

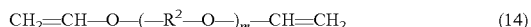

$$CH_2=CH-O-(-R^2-O-)_m-CH=CH_2 \quad (14)$$

where $R^2$ in Formula (14) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and $-[(-CH_2-)_p-O-]_q-(-CH_2-)_r-$, where p is an integer ranging from 2 to 6, q is an integer from 1 to 5, and r is an integer from 2 to 10. In certain embodiments of a divinyl ether of Formula (14), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, $-[(-CH_2-)_p-O-]_q-(-CH_2-)_r-$.

Suitable divinyl ethers include, for example, compounds having at least one oxyalkanediyl group, such as from 1 to 4 oxyalkanediyl groups, i.e., compounds in which m in Formula (14) is an integer ranging from 1 to 4. In certain embodiments, m in Formula (14) is an integer ranging from 2 to 4. It is also possible to employ commercially available divinyl ether mixtures that are characterized by a non-integral average value for the number of oxyalkanediyl units per molecule. Thus, m in Formula (14) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) ($R^2$ in Formula (14) is ethanediyl and m is 1), butanediol divinyl ether (BD-DVE) ($R^2$ in Formula (14) is butanediyl and m is 1), hexanediol divinyl ether (HD-DVE) ($R^2$ in Formula (14) is hexanediyl and m is 1), diethylene glycol divinyl ether (DEG-DVE) ($R^2$ in Formula (4) is ethanediyl and m is 2), triethylene glycol divinyl ether ($R^2$ in Formula (14) is ethanediyl and m is 3), tetraethylene glycol divinyl ether ($R^2$ in Formula (14) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which $R^2$ in Formula (14) is $C_{3-6}$ branched alkanediyl may be prepared by reacting a polyhydroxy compound with acetylene. Examples of divinyl ethers of this type include compounds in which $R^2$ in Formula (14) is an alkyl-substituted methanediyl group such as $-CH(CH_3)-$ (for example Pluriol® blends such as Pluriol®E-200 divinyl ether (BASF Corp., Parsippany, N.J.), for which $R^2$ in Formula (14) is ethanediyl and m is 3.8) or an alkyl-substituted ethanediyl (for example $-CH_2CH(CH_3)-$ such as DPE polymeric blends including DPE-2 and DPE-3 (International Specialty Products, Wayne, N.J.)).

Other useful divinyl ethers include compounds in which $R^2$ in Formula (14) is polytetrahydrofuryl (poly-THF) or polyoxyalkanediyl, such as those having an average of about 3 monomer units.

Two or more types of polyvinyl ether monomers of Formula (14) may be used. Thus, in certain embodiments, two dithiols of Formula (6) and one polyvinyl ether monomer of Formula (14), one dithiol of Formula (6) and two polyvinyl ether monomers of Formula (14), two dithiols of Formula (6) and two divinyl ether monomers of Formula (14), and more than two compounds of one or both formulas, may be used to produce a variety of thiol-functional polythioethers.

In certain embodiments, a polyvinyl ether monomer comprises 20 to less than 50 mole percent of the reactants used to prepare a thiol-functional polythioether, and, in certain embodiments, 30 to less than 50 mole percent.

In certain embodiments provided by the present disclosure, relative amounts of dithiols and divinyl ethers are selected to yield terminal thiol groups. Thus, a dithiol of Formula (6) or a mixture of at least two different dithiols of Formula (6), are reacted with of a divinyl ether of Formula (14) or a mixture of at least two different divinyl ethers of Formula (14) in relative amounts such that the molar ratio of thiol groups to vinyl groups is greater than 1:1, such as 1.1 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-functional polythioethers provided by the present disclosure may be prepared by combining at least one compound of Formula (6) and at least one compound of Formula (14) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (15):

$$B(-A-SH)_z \quad (15)$$

wherein: (i) A comprises a structure of Formula (15), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-functional polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents can also be used.

As a result, thiol-functional polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-functional polythioethers having a functionality greater than 2.0 may be prepared in a manner similar to the difunctional thiol-functional polythioethers described in U.S. Publication No. 2010/0010133. In certain embodiments, polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-functional polythioether having a functionality greater than 2.0.

Thus, in certain embodiments, a thiol-terminated polythioether comprises the reaction product of reactants comprising:
(a) a dithiol of Formula (6):

wherein:
  $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$; wherein:
    each $R^3$ is independently selected from hydrogen and methyl;
    each X is independently selected from $-O-$, $-S-$, $-NH-$, and $-NR-$
  wherein R is selected from hydrogen and methyl;
    s is an integer from 2 to 6;
    q is an integer from 1 to 5; and
    r is an integer from 2 to 10; and
(b) a divinyl ether of Formula (14):

$$CH_2=CH-O-[-R^2-O-]_m-CH=CH_2 \qquad (14)$$

wherein:
  each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined above;
  m is an integer from 0 to 50;
  n is an integer from 1 to 60; and
  p is an integer from 2 to 6.

And, in certain embodiments, the reactants comprise (c) a polyfunctional compound such as a polyfunctional compound $B(-V)_z$, where B, $-V$, and z are as defined herein.

Thiol-terminated polythioethers provided by the present disclosure represent thiol-terminated polythioethers having a molecular weight distribution. In certain embodiments, thiol-terminated polythioethers useful in compositions can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, thiol-terminated polythioethers useful in compositions provided by the present disclosure exhibit a polydispersity ($M_w/M_n$; weight average molecular weight/number average molecular weight) ranging from 1 to 20, and in certain embodiments, from 1 to 5. The molecular weight distribution of thiol-terminated polythioethers may be characterized by gel permeation chromatography.

In certain embodiments, a thiol-terminated sulfur-containing polymer comprises a thiol-terminated polysulfide.

As used herein, the term "polysulfide" refers to a polymer that contains one or more disulfide linkages, i.e., $-[S-S]-$ linkages, in the polymer backbone and/or in the terminal or pendant positions on the polymer chain. Often, a polysulfide polymer will have two or more sulfur-sulfur linkages. Suitable polysulfides are commercially available from Akzo Nobel under the name Thioplast®. Thioplast® products are available in a wide range of molecular weights ranging, for example, from less than 1,100 to over 8,000, with molecular weight being the average molecular weight in grams per mole. In certain embodiments, a polysulfide has a number average molecular weight of 1,000 to 4,000. The crosslink density of these products also varies, depending on the amount of crosslinking agent used. The —SH content, i.e., mercaptan or thiol content, of these products can also vary. The mercaptan content and molecular weight of the polysulfide can affect the cure speed of the polymer, with cure speed increasing with molecular weight.

In certain embodiments, in addition to or in lieu of, a polysulfide as previously described, comprising thiol-terminated polysulfide comprises a polymeric mixture comprising: (a) from 90 mole percent to 25 mole percent of mercaptan terminated disulfide polymer of the formula $HS(RSS)_mR'SH$; and (b) from 10 mole percent to 75 mole percent of diethyl formal mercaptan terminated polysulfide polymer of the formula $HS(RSS)_nRSH$, wherein R is $-C_2H_4-O-CH_2-O-C_2H_4-$; R' is a divalent member selected from alkyl of from 2 to 12 carbon atoms, alkyl thioether of from 4 to 20 carbon atoms, alkyl ether of from 4 to 20 carbon atoms and one oxygen atom, alkyl ether of from 4 to 20 carbon atoms and from 2 to 4 oxygen atoms each of which is separated from the other by at least 2 carbon atoms, alicyclic of from 6 to 12 carbon atoms, and aromatic lower alkyl; and the value of m and n is such that the diethyl formal mercaptan terminated polysulfide polymer and the mercaptan terminated disulfide polymer have an average molecular weight of from 1,000 to 4,000, such as 1,000 to 2,500. Such polymeric mixtures are described in U.S. Pat. No. 4,623,711 at col. 4, line 18 to col. 8, line 35, the cited portion of which being incorporated herein by reference. In some cases, R' in the above formula is $-CH_2-CH_2-$; $-C_2H_4-O-C_2H_4-$; $-C_2H_4-S-C_2H_4-$; $-C_2H_4-O-C_2H_4-O-C_2H_4-$; or $-CH_2-C_6H_4-CH_2-$.

In certain embodiments, a polysulfide comprises a thiol-terminated polysulfide such as those commercially available from Akzo Nobel under the name Thioplast® and from Toray under the name Thiokol®-LP.

A curing agent may be selected that is reactive with the terminal groups of the sulfur-containing polymer and the sulfur-containing compound. In certain embodiments, a sulfur-containing polymer and a sulfur-containing compound provided by the present disclosure comprise the same groups reactive with the curing agent. For example, in certain embodiments, both a sulfur-containing polymer and a sulfur-containing compound provided by the present disclosure comprise reactive thiol groups, and the curing agent comprises reactive alkenyl groups, epoxy groups, isocyanate groups, or Michael acceptor groups.

In certain embodiments, a sulfur-containing compound provided by the present disclosure may be present in an amount from 0.1 wt % to 15 wt % of a composition, such as 0.1 to less than 5 wt %, 0.1 to less than 2 wt %, and in certain embodiments, 0.1 to less than 1 wt %, based on the total dry weight of the composition.

In certain embodiments, compounds provided by the present disclosure comprise, in addition to the one or more sulfur-containing compounds provided by the present disclosure, one or more additional adhesion promoters. A one or more additional adhesion promoter may be present in an amount from 0.1 wt % to 15 wt % of a composition, such as 0.1 to less than 5 wt %, 0.1 to less than 2 wt %, and in certain embodiments, 0.1 to less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, $—Si(—R)_m(—OR)_{3-m}$, where each R is independently selected from hydrogen, alkyl, cycloalkyl, aryl, and others, and m is selected from 0, 1, and 2. Examples of ethylenically unsaturated silanes are disclosed in U.S. Publication no. 2012/0040104, which is incorporated herein by reference.

In certain embodiments, a sulfur-containing ethylenically unsaturated silane, which is suitable for use in a composition provided by the present disclosure, comprises the reaction products of reactants comprising (i) a mercaptosilane, and (ii) a polyene. As used herein, the term mercaptosilane refers to a molecular compound that comprises, within the molecule, (i) at least one mercapto (—SH) group, and (ii) at least one silane group. Suitable mercaptosilanes include, for example, those having a structure $HS—R'—Si(—R)_m(—OR)_{3-m}$, where R and m are defined as for a silane group, and R' is a divalent organic group.

Examples of mercaptosilanes, which are suitable for use in preparing the sulfur-containing ethylenically unsaturated silanes include γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane mercaptomethyltriethoxysilane, and combinations of any of the foregoing.

In certain embodiments, a polyene used to prepare sulfur-containing ethylenically unsaturated silanes comprises a triene, which refers to a compound containing three carbon-carbon double bonds, such as, for example, triallyl cyanurate and triallyl isocyanurate.

In certain embodiments, a polyene comprises a triene, such as one or more of the foregoing triallyl compounds, and a mercaptosilane and triene are reacted together in relative amounts such that the resulting reaction product theoretically comprises an average of at least two ethylenically unsaturated groups per molecule. In certain embodiments, an ethylenically unsaturated silane comprises the reaction products of γ-mercaptopropyltrimethoxysilane and triallyl cyanurate.

In certain embodiments, compositions provided by the present disclosure contain an essentially stoichiometric equivalent amount of thiol groups to "ene" groups in order to obtain a cured sealant having acceptable sealant properties as described herein upon exposure of the composition to actinic radiation. As used herein, "essentially stoichiometric equivalent" means that the number of thiol groups and "ene" groups present in the compositions differ by no more than 10% from each other, in some cases, no more than 5% or, in some cases, no more than 1% or no more than 0.1%. In some cases, the number of thiol groups and "ene" groups present in the composition are equal. Moreover, as will be appreciated, the source of "ene" groups can include the ethylenically unsaturated silane itself (if used) as well as the other polyene(s) included in the composition. In certain embodiments, an ethylenically unsaturated silane is present in an amount such that 0.1 to 30, such as 1 to 30, or, in some cases, 10 to 25 percent of the total number of ethylenically unsaturated groups present in the composition are part of an ethylenically unsaturated silane molecule, based on the number of ethylenically unsaturated groups in the composition.

In certain embodiments, methods provided by the present disclosure comprise exposing an uncured sealant composition to actinic radiation to provide a cured sealant. In certain embodiments, particularly when the cured sealant is to be formed by exposure of the previously described uncured sealant composition to UV radiation, the composition also comprises a photoinitiator. As will be appreciated by those skilled in the art, a photoinitiator absorbs ultraviolet radiation and transforms it into a radical that initiates polymerization. Photoinitiators are classified in two major groups based upon a mode of action, either or both of which may be used in the compositions described herein. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Non-limiting examples of suitable photoinitiators include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis (2,6-dichlorobenzoyl)-2,4,4-trimethylpentylphosphine oxide, and combinations thereof.

In certain embodiments, a composition described herein comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the composition.

As described above, in certain embodiments, methods comprise exposing an uncured sealant composition to actinic radiation to provide a cured sealant. In certain embodiments, a thiol-ene reaction, which forms the cured sealant, can be carried out by irradiating an uncured composition comprising: (a) a thiol-terminated polythioether (such as any of those described above); (b) a sulfur-containing adhesion promoter, and (c) a polyene comprising a polyvinyl ether and/or a polyallyl compound as described above, with actinic radiation. As used herein, actinic radiation encompasses electron beam (EB) radiation, ultraviolet (UV) radiation, and visible light. In many cases, a thiol-ene reaction is effected by irradiating the composition with UV light and, in such cases, as mentioned above; the composition often further comprises a photoinitiator, among other optional ingredients.

Ultraviolet radiation from any suitable source which emits ultraviolet light having a wavelength ranging from, for example, 180 nm to 400 nm, may be employed to initiate the thiol-ene reaction described above and thereby form the cured sealant. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions can exhibit an excellent degree of cure in air at relatively low energy exposure in ultraviolet light.

In certain embodiments, compositions provided by the present disclosure may be cured using actinic radiation. Examples of compositions comprising polythioether compositions curable using actinic radiation are disclosed in U.S. Publication no. 2012/0040104. Such compositions may include, in addition to a sulfur-containing compound (adhesion promoter) provided by the present disclosure, and one or more sulfur-containing polymers such as thiol-terminated sulfur-containing polymers, a polyene such as a polyvinyl ether including, for example, a polyvinyl ether of Formula (14).

Although it is intended the compositions provided by the present disclosure are UV curable, as will be understood by those skilled in the art, other curing chemistries may also be employed with the use of one or more appropriate curing agents. The term curing agent refers to a compound that can be added to a composition provided by the present disclosure to accelerate the curing or gelling of the composition. Curing or cure can refer to the point at which the sealant achieves a cure hardness of 30 Durometer as measured according to ASTM D2240. Any suitable curing agent can be used. In certain embodiments, a curing agent comprises an oxidizing agent that oxidizes terminal mercaptan groups to form disulfide bonds. Suitable oxidizing curing agents include, for example, lead dioxide, manganese dioxide, calcium dioxide, sodium perborate monohydrate, calcium peroxide, zinc peroxide, dichromate and epoxy. Other suitable curing agents may contain reactive functional groups that are reactive with the functional groups in the sulfur-containing polymers disclosed herein. Examples include polythiols such as polythioethers; polyisocyanates such as isophorone, diisocyanate, and hexamethylene diisocyanate including mixtures thereof and including isocyanurate derivatives thereof; and polyepoxides. Examples of polyepoxides include hydantoin diepoxide, bisphenol-A epoxies, bisphenol-F epoxies, Novolac type epoxies, aliphatic polyepoxides, and any of the epoxidized unsaturated and phenolic resins. The term polyepoxide refers to a compound having a 1,2-epoxy equivalent greater than one and includes monomers, oligomers, and polymers.

In certain embodiments, compositions provided by the present disclosure comprise one or more curing agents such as an iso-epoxy, an isocyanate, and a combination thereof.

Compositions provided by the present disclosure may include one or more catalysts.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 µm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, a thiol-terminated sulfur-containing polymer including a combination of thiol-terminated sulfur-containing polymers comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

In certain embodiments, a thiol-terminated polythioether including a combination of thiol-terminated polythioethers comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from about 0% to 60% by weight. In certain embodiments, additives may be present in a composition in an amount ranging from about 25% to 60% by weight.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more thiol-terminated polythioethers provided by the present disclosure and a second package comprises one or more polyfunctional sulfur-containing epoxies provided by the present disclosure. Additives and/or other materials may be added to either package as desired or necessary. The two packages may be combined and mixed prior to use. In certain embodiments, the pot life of the one or more mixed thiol-terminated polythioethers and epoxies is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Cured compositions such as cured sealants exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that when cured, curable compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting an elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi and in some cases at least 400 psi when measured according to the procedure described in SAE AS5127/1 paragraph 7.8.

In certain embodiments, compositions provided by the present disclosure provide a cured sealant having a lap shear strength of >200 psi, such as at least 220 psi, or, in certain embodiments, at least 250 psi, when measured according to Paragraph 7.8 of AS 5127/1.

In certain embodiments, a cured sealant comprising a composition provided by the present disclosure meets or exceeds the requirements for aerospace sealants as set forth in AMS 3277.

Curable compositions of the present disclosure can exhibit a $T_g$ when cured of −55° C. or less, in certain embodiments, −60° C. or less, and in certain embodiments −65° C. or less. The glass transition temperature, $T_g$, can be measured by differential scanning calorimetry.

Furthermore, methods are provided for sealing an aperture utilizing a composition provided by the present disclosure. These methods comprise, for example, applying a composition provided by the present disclosure such as a sealant to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

In certain embodiments, a composition may be cured under ambient conditions, where ambient conditions refer to a temperature from 20° C. to 25° C. In certain embodiments, a composition may be cured under conditions encompassing a temperature from a 0° C. to 100° C. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles including aircraft and aerospace vehicles.

Apertures, including apertures of aerospace vehicles, sealed with compositions provided by the present disclosure are also disclosed.

EXAMPLES

Embodiments provided by the present disclosure are further illustrated by reference to the following examples, which describe the synthesis, properties, and uses of certain sulfur-compounds and compositions comprising such sulfur-containing compounds. It will be apparent to those skilled in the art that many modifications, both to materials, and methods, may be practiced without departing from the scope of the disclosure.

Example 1

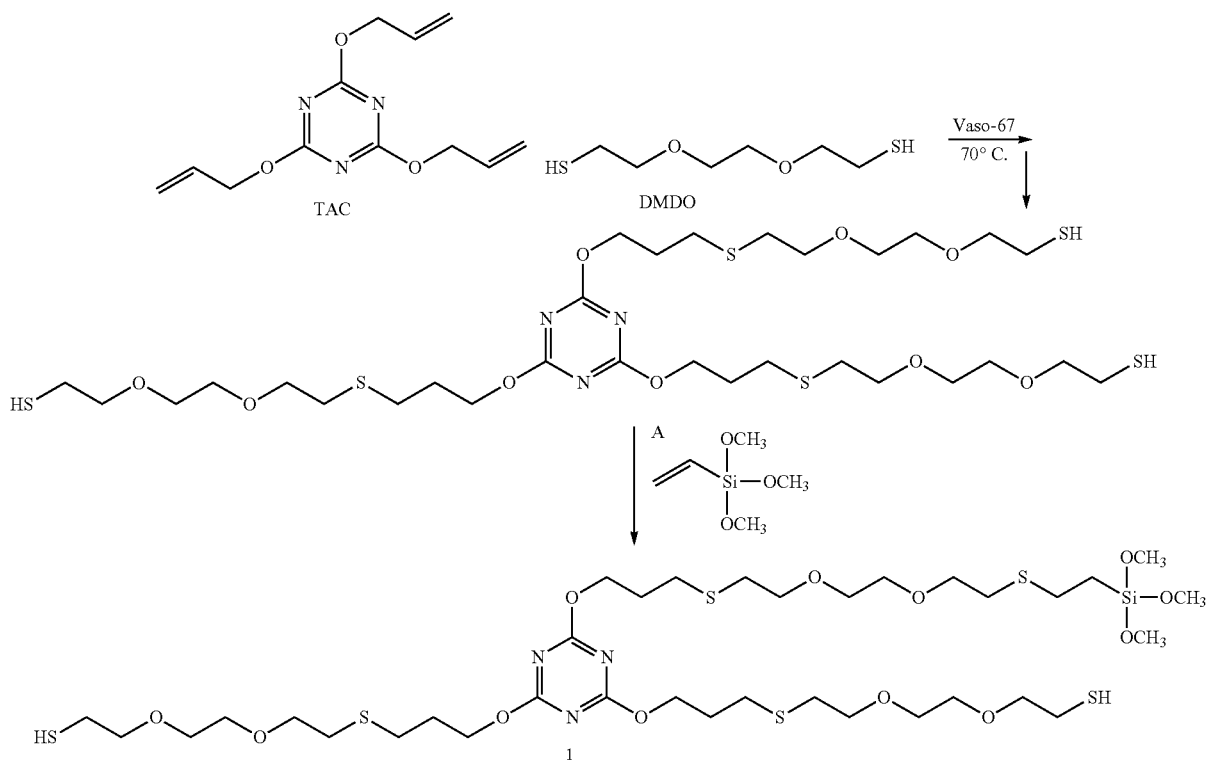

In a 300 mL, 3-necked, round-bottom flask fitted with a thermal probe, mechanical stirrer, and nitrogen ($N_2$) inlet, 98 g (0.394 mol) of triallylcyanurate (TAC) and 215 g of 1,8-dimercapto-3,6-dioxaoctane (DMDO) were charged, and the mixture stirred at room temperature for 20 minutes. The mixture was then heated to 70° C., and 100 mg of Vazo®-67 (Dupont) was added. The reaction mixture was maintained at 70° C. for 8 hours to provide thiol-terminated intermediate A. The progress of the reaction was monitored by determining the mercaptan equivalent weight (MEW). The final MEW was 297, and the material had a viscosity of 20 poise at 25° C., spindle #6 at 50 RPM, measured using a CAP2000 viscometer.

In a 300 mL, 3-necked, round bottom flask fitted with a thermal probe, mechanical stirrer, and nitrogen ($N_2$) inlet, 99 g (0.374 mol) of thiol-terminated intermediate A was added. Then, 18 g (0.123 mol) of vinyltrimethoxysilane (Silquest® A-171, Momentive Performance Materials) was slowly added to the flask. The reaction was stirred until the temperature stabilized. After the temperature stabilized, the temperature of the reaction was set to 70° C. and 100 mg of Vazo®-67 was added. The progress of the reaction was monitored by MEW. The reaction was complete in 12 hours to provide sulfur-containing compound 1 with a final MEW of 431.

Example 2

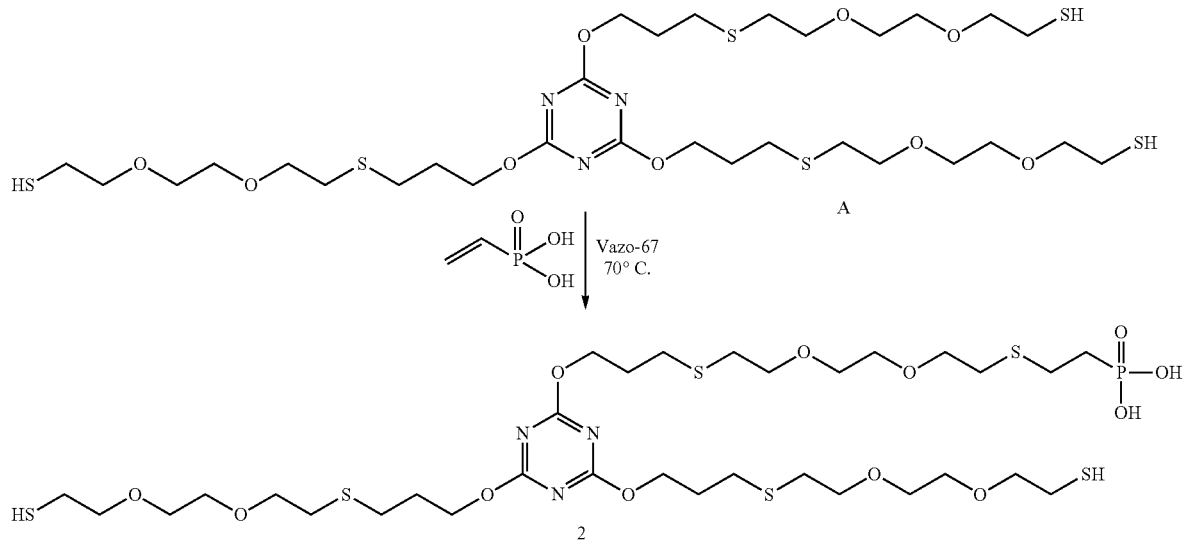

In a 300 mL, 3-necked, round-bottom flask fitted with a thermal probe, mechanical stirrer, and nitrogen ($N_2$) inlet, 58 g (0.218 mol) of thiol-terminated intermediate A of Example 1 and 7.8 g of vinyl phosphonic acid (VPA) were added at 18° C. After addition, there was a small exotherm to 21° C. The temperature of the reaction was set to 65° C. and 75 mg of Vazo®-67 was added. The reaction was stirred for 6 hours. The reaction was restarted again after sitting for 17 hours at room temperature and 70 mg of Vazo®-67 was added. After stirring for an additional 4 hours at elevated temperature, the reaction was complete. The final MEW of sulfur-containing compound 2 was 436.

Example 3

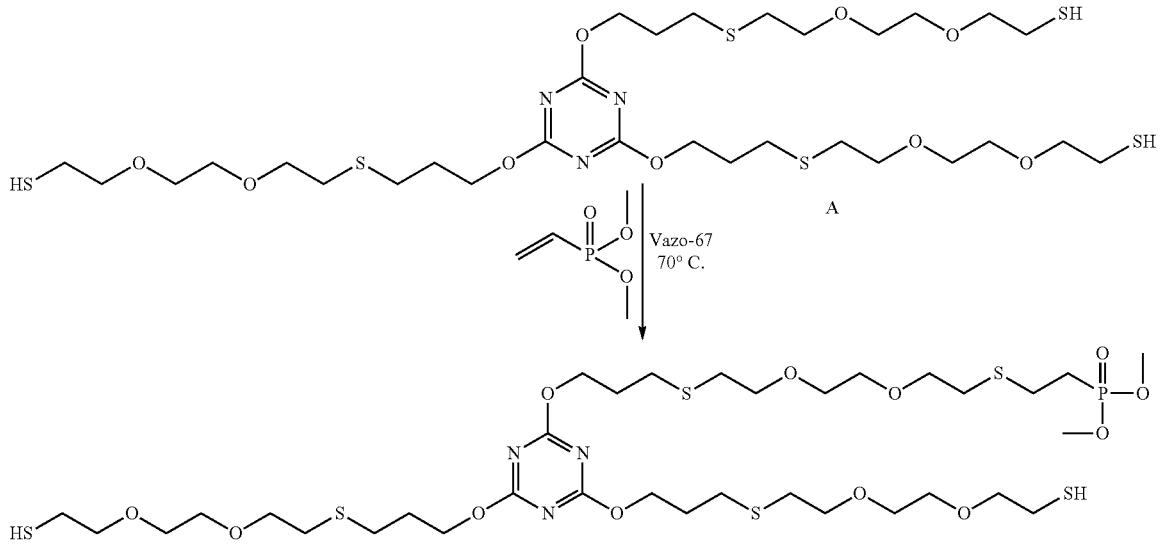

In a 300 mL, 3-necked, round-bottom flask fitted with a thermal probe, mechanical stirrer, and nitrogen (N$_2$) inlet, 36 g (0.127 mol) of thiol-terminated intermediate A of Example 1 and 5.7 g of vinyl phosphonic methyl ester (VPA) were added at 18° C. After addition there was a small exotherm to 21° C. The temperature of the reaction was set to 100° C. and 171 mg of Vazo®-67 was added. The reaction was stirred for 14 hours. The final MEW of sulfur-containing compound 3 was 456.

Example 4

In a 300 mL, 3-necked, round-bottom flask fitted with a thermal probe, mechanical stirrer, and nitrogen (N$_2$) inlet, 49 g (0.476 mol) diethylenetriamine, 54 g (0.475 mol) allylglycidol ether, and 43 g (0.714 mol) isopropyl alcohol (IPA) were added at room temperature and stirred for 10 minutes. The temperature was then set to 64° C. and after 10 minutes increased to 120° C. The reaction was removed from the heat source, while stirring. The reaction was monitored by determining the epoxide equivalent weight (EEW). When the EEW reached 5412, 94% of the epoxide was consumed and the reaction was stopped to provide 1-(allyloxy)-3-(2-(2-aminoethylamino)ethylamino)propan-2-ol. The IPA was removed by rotary evaporation.

In a 300 mL, 3-necked, round-bottom flask fitted with a thermal probe, mechanical stirrer, and nitrogen (N$_2$) inlet, 5 g (0.026 mol) of 1-(allyloxy)-3-(2-(2-aminoethylamino)ethylamino)propan-2-ol and 22.48 g (0.026 mol) of thiol-terminated intermediate A of Example 1, and 100 mg of Vazo®-67 were added. The temperature of the reaction was set to 80° C. and the reaction was monitored by MEW. After 2 hours, the reaction was complete and the final MEW of sulfur-containing compound 4 was 549.

Example 5

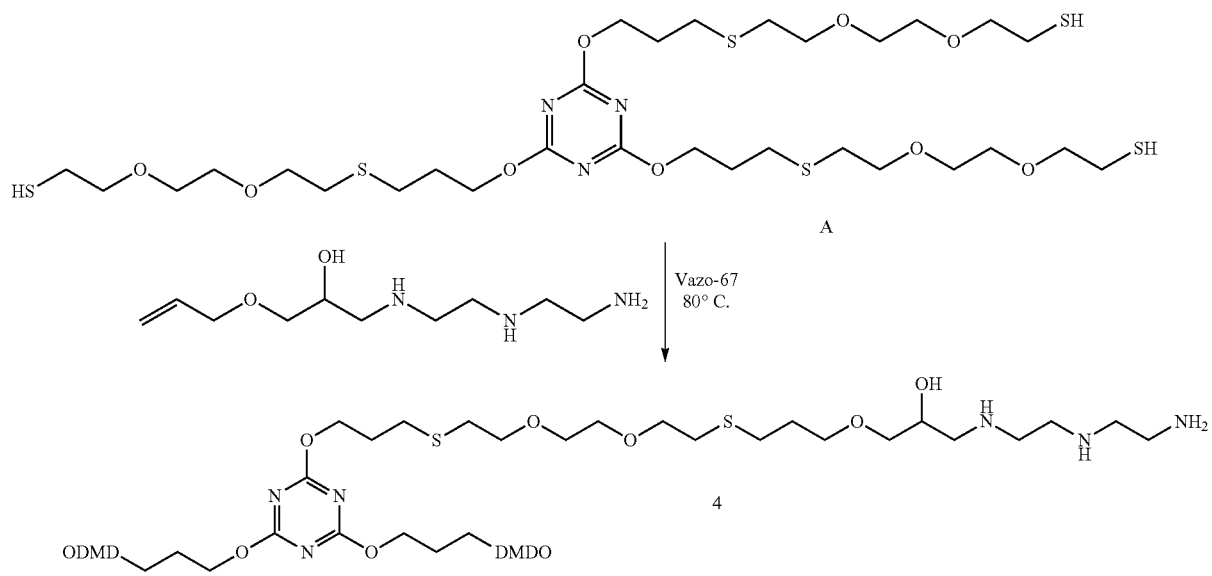

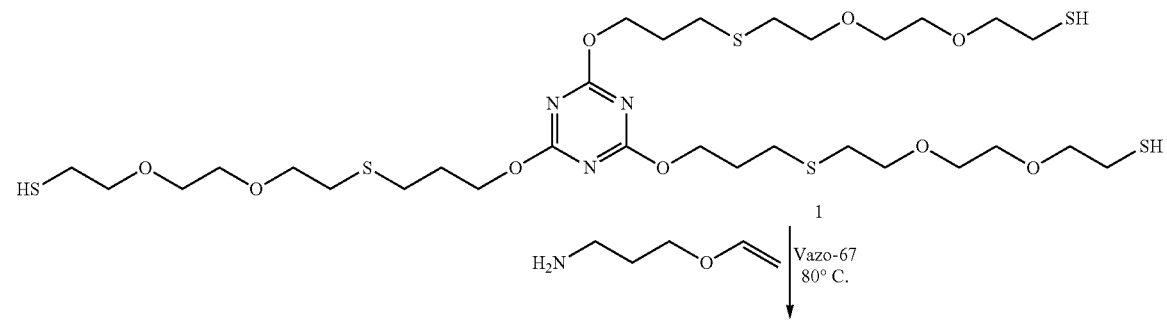

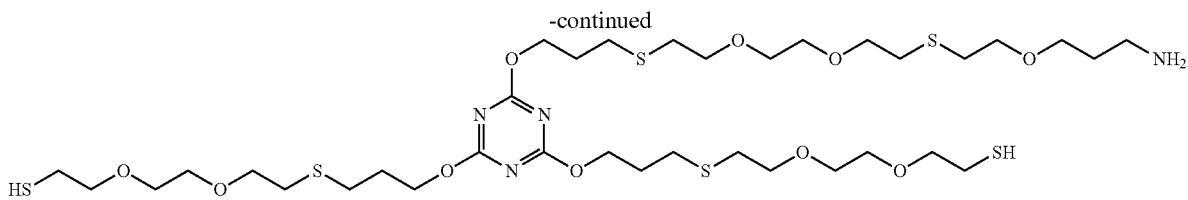

In a 300 mL, 3-necked, round bottom flask, fitted with a thermal probe, mechanical stirrer, and nitrogen ($N_2$) inlet, 6.3 g (0.062 mol) of aminopropylvinylether and 53.5 g (0.069 mol) of the thiol-terminated intermediate A of Example 1 were added. The temperature of the reaction was set to 80° C. and 50 mg of Vazo®-67 was added. The reaction was monitored by MEW. After two hours the MEW of the reaction was 445, indicating that about one-third of the mercaptan groups were reacted and the reaction was considered complete. The viscosity was 350 poise with spindle #6, 50 RPM, measured using a CAP2000 viscometer.

Example 6

Comparative Composition 1

The components of Comparative Composition 1 are shown in Table 1.

TABLE 1

| Comparative Composition 1. | | |
|---|---|---|
| Component | Charge (g) | Weight (%)** |
| Polythioethers[§] | 40 | 92.7 |
| TEG-DVE | 2.3 | 5.3 |
| TAC-sil | 0.34 | 0.78 |
| Silane* | 0.34 | 0.79 |
| Irgacure ® 2022 | 0.21 | 0.49 |

*Silane is 3-(N-styrylmethyl-2-aminoethylamino) propyltrimethoxysilane.
**Weight % based on total solids weight of the composition.
[§]Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, triethyeneglycol divinyl ether (TEG-DVE), the adduct described in Example 12 of U.S. Publication No. 2012/0040104 (TAC-Sil), and 3-(N-styrylmethyl-2-aminoethylamino)propyltrimethoxysilane (Gelest, Morrisville, Pa.) were added to the 60-gram container. The container was place in a high-speed mixer (DAC 600 FVZ) and mixed for 30 seconds at 2,300 rpm. The container was opened, Irgacure® 2022(BASF) was added, and the container placed in the speed mixer and the composition mixed for 1 minute at 2,300 rpm.

Example 7

Composition 2

The components of Composition 2 are shown in Table 2.

TABLE 2

| Composition 2. | | |
|---|---|---|
| Component | Charge (g) | Weight (%)** |
| Polythioethers[§] | 40 | 90.3 |
| Compound 1, Example 1 | 1.07 | 2.42 |
| TEG-DVE | 2.34 | 5.3 |
| TAC-sil | 0.334 | 0.75 |
| Silane* | 0.338 | 0.76 |
| Irgacure ® 2022 | 0.22 | 0.50 |

*Silane is 3-(N-styrylmethyl-2-aminoethylamino) propyltrimethoxysilane.
**Weight % based on total solids weight of the composition.
[§]Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, sulfur-containing adhesion promoter 1 of Example 1, triethyene glycol divinyl ether (TEG-DVE), the adduct described in Example 12 of U.S. Publication No. 2012/0040104 (TAC-Sil), and 3-(N-styrylmethyl-2-aminoethylamino)propyltrimethoxysilane (Gelest, Morrisville, Pa.) were added to the 60-gram container. The container was placed in a high-speed mixer (DAC 600 FVZ) and mixed for 30 seconds at 2,300 rpm. The container was opened, Irgacure® 2022 (BASF) added, and the composition mixed for 1 minute at 2,300 rpm.

Example 8

Composition 3

The components of Composition 3 are shown in Table 3.

TABLE 3

| Composition 3. | | |
|---|---|---|
| Component | Charge (g) | Weight (%)** |
| Polythioethers[§] | 50 | 90.1 |
| Compound 2, Example 2 | 1.4 | 2.5 |
| TEG-DVE | 3.2 | 5.8 |
| TAC-sil | 0.61 | 1.1 |
| Iracure ® 2022 | 0.275 | 0.50 |

*Silane is 3-(N-styrylmethyl-2-aminoethylamino) propyltrimethoxysilane.
**Weight % based on total solids weight of the composition.
[§]Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, the sulfur-containing adhesion promoter 2 of Example 2, triethyene glycol divinyl ether (TEG-DVE), and the adduct described in Example 12 of U.S. Publication No. 2012/0040104 (TAC-Sil), were added to the 60-gram container. The container was placed in a high-speed mixer (DAC 600 FVZ) and mixed for 30 seconds for 2,300 rpm. The container was opened, Irgacure® 2022 (BASF) added, and the composition mixed for 1 minute at 2,300 rpm.

Example 9

Composition 4

The components of Composition 4 are shown in Table 4.

TABLE 4

| Composition 4. | | |
|---|---|---|
| Component | Charge (g) | Weight (%)** |
| Polythioethers§ | 50 | 83.9 |
| Compound 3, Example 3 | 1.44 | 2.4 |
| TEGDVE | 2.23 | 3.7 |
| TAC | 0.79 | 1.3 |
| TAC-sil | 0.7 | 1.2 |
| Silane* | 1.1 | 1.8 |
| Silquest ® A-1120 | 0.28 | 0.47 |
| Silica | 2.8 | 4.70 |
| Irgacure ® 2022 | 0.28 | 0.47 |

*Silane is 3-(N-styrylmethyl-2-aminoethylamino) propyltrimethoxysilane
§Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, the sulfur-containing adhesion promoter 3 of Example 3, triethyene glycol divinyl ether (TEG-DVE), the adduct described in Example 12 of U.S. Publication No. 2012/0040104 (TAC-Sil), 3-(N-styrylmethyl-2-aminoethylamino)propyltrimethoxysilane (Gelest, Morrisville, Pa.), Silquest A-1120, and silica were added to the 60-gram container. The container was place in a high-speed mixer (DAC 600 FVZ) and mixed for 30 seconds at 2,300 rpm. The container was opened, Irgacure® 2022 (BASF) added, and the composition mixed for 1 minute at 2,300 rpm.

Example 10

Composition 5

The components of Composition 5 are shown in Table 5.

TABLE 5

| Composition 5. | | |
|---|---|---|
| Component | Charge (g) | Weight (%)** |
| Polythioethers§ | 50 | 91.1 |
| Compound 4, Example 4 | 1.5 | 2.7 |
| TEG-DVE | 2.7 | 4.9 |
| TAC-sil | 0.67 | 1.2 |
| Irgacure ® 2022 | 0.27 | 0.49 |

§Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, the sulfur-containing adhesion promoter 4 of Example 4, triethyene glycol divinyl ether (TEG-DVE), and the adduct described in Example 12 of U.S. Publication No. 2012/0040104 (TAC-Sil) were added to the 60-gram container. The container was place in a high-speed mixer (DAC 600 FVZ) and mixed for 30 seconds for 2,300 rpm. The container was opened, Irgacure® 2022 (BASF) was added, and the composition mixed for 1 minute at 2,300 rpm.

Example 11

Composition 6

The components of Composition 6 are shown in Table 6.

TABLE 6

| Composition 6. | | |
|---|---|---|
| Component | Charge (g) | Weight (%)** |
| Polythioethers§ | 50 | 91.1 |
| Compound 5, Example 5 | 1.2 | 2.2 |
| TEG-DVE | 2.7 | 4.9 |
| TAC-sil | 0.67 | 1.2 |
| Irgacure ® 2022 | 0.27 | 0.49 |

§Thiol-terminated polythioethers of the type described in U.S. Pat. No. 6,172,179, average thiol functionality: 2.05-2.95, commercially available from PRC-Desoto International, Inc., Sylmar, CA.

Mixing was performed in a 60-gram plastic container with a lid. The thiol-terminated polythioethers, the sulfur-containing adhesion promoter of Example 5, triethyene glycol divinyl ether (TEG-DVE), and the adduct described in Example 12 of U.S. Publication No. 2012/0040104 (TAC-Sil) were added to the 60-gram container. The container was place in a high-speed mixer (DAC 600 FVZ) and mixed for 30 seconds for 2,300 rpm. The container was opened, Irgacure® 2022 (BASF) was added, and the composition mixed for 1 minute at 2,300 rpm.

Example 12

Adhesion Measurement

The mixed compositions of Examples 6-8, 10, and 11 were individually poured onto an anodized aluminum panel (Mil-227725), and placed under UV light for 90 seconds, after which time the compositions had cured to a tack-free solid. The compositions were cured using a Phoseon Firefly curing unit, available from Phoseon Technology, Hillsboro, Oreg.

The cured panels were maintained at ambient conditions for a predetermined number of days, after which time, adhesion was measured as percent of cohesive failure. An adhesion scale ranging from 0 to 5 was assigned to each test, with a value of 5 being 100% cohesive failure and a value of 0 being 100% adhesive failure. (Note that the adhesion test method is not a standardized test).

The adhesion of the cured compositions are shown in Table 7.

TABLE 7

| Adhesion of compositions to anodized aluminum panels. | | |
|---|---|---|
| Composition | Adhesion Promoter | Anodized |
| Comparative Composition 1, Example 6 | none | 3 |
| Composition 2, Example 7 | 1 | 5 |
| Composition 3, Example 8 | 2 | 4 |
| Composition 5, Example 10 | 4 | 5 |
| Composition 6, Example 11 | 5 | 5 |

The results demonstrate that compositions comprising copolymerizable sulfur-containing adhesion promoters provided by the present disclosure exhibit enhanced adhesion to anodized aluminum substrates compared to similar compositions without a copolymerizable sulfur-containing adhesion promoter.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A sulfur-containing compound having the structure of Formula (1):

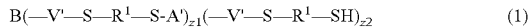

wherein
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;
wherein:
each $R^3$ is independently selected from hydrogen and methyl;
each X is independently selected from $-O-$, $-S-$, and $-NR-$
wherein R is selected from hydrogen and methyl;
s is an integer from 2 to 6;
q is an integer from 1 to 5; and
r is an integer from 2 to 10;
each A' independently represents a moiety formed by the reaction of a compound A with a thiol group, wherein compound A is a compound having a terminal group that is reactive with a thiol group and a terminal group that promotes adhesion;
B represents a core of a z-valent, alkenyl-terminated polyfunctional compound $B(-V)_z$,
wherein:
z is the sum of z1 and z2, and z is an integer from 3 to 6;
z1 is an integer from 1 to 4;
z2 is an integer from 2 to 5; and
each $-V$ is a moiety comprising a terminal group that is reactive with a thiol group; and
each $-V'-$ represents a moiety formed by the reaction of each $-V$ with a thiol group.

2. The sulfur-containing compound of claim 1, wherein the group that is reactive with a thiol group in compound A is selected from an alkenyl group, an isocyanate group, and an epoxy group.

3. The sulfur-containing compound of claim 1, wherein the group that promotes adhesion is selected from a silane, a phosphonate, an amine, a carboxylic acid, and a phosphonic acid.

4. The sulfur-containing compound of claim 1, wherein A is selected from:
(a) a compound of Formula (2):

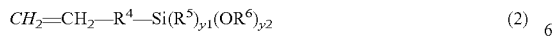

wherein
y1 is selected from 0, 1, and 2; y2 is selected from 1, 2, and 3; and the sum of y1 and y2 is 3;
$R^4$ is selected from a covalent bond and $C_{1-6}$ alkanediyl;
each $R^5$ is independently selected from $C_{1-4}$ alkyl; and
each $R^6$ is independently selected from $C_{1-4}$ alkyl;

(b) a compound of Formula (3):

wherein
$R^7$ is selected from a covalent bond and $C_{1-6}$ alkanediyl; and
each $R^8$ is independently selected from hydrogen and $C_{1-4}$ alkyl;

(c) a compound of Formula (4):

wherein $R^9$ is selected from $C_{1-10}$ alkanediyl, substituted $C_{1-10}$ alkanediyl, $C_{1-10}$ heteroalkanediyl, and substituted $C_{1-10}$ heteroalkanediyl; and (d) a compound of Formula (5):

wherein
$R^{10}$ is $C_{1-6}$ alkanediyl.

5. The sulfur-containing compound of claim 1, wherein A is a compound comprising a Michael acceptor and a group that promotes adhesion.

6. A sulfur-containing compound comprising the reaction product of reactants comprising:
(a) a polyfunctional compound having terminal groups that are reactive with thiol groups;
(b) a dithiol; and
(c) a compound having a terminal group that is reactive with a thiol group and a terminal group that promotes adhesion.

7. The sulfur-containing compound of claim 6, wherein the terminal group that is reactive with a thiol group is selected from an alkenyl group, an isocyanate group, an epoxy group and a Michael acceptor group.

8. The sulfur-containing compound of claim 6, wherein the terminal group that promotes adhesion is selected from a silane, a phosphonate, an amine, a carboxylic acid, and a phosphonic acid.

9. The sulfur-containing compound of claim 6, wherein the dithiol has the structure of Formula (6):

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;
wherein:
each $R^3$ is independently selected from hydrogen and methyl;
each X is independently selected from $-O-$, $-S-$, and $-NR-$ wherein R is selected from hydrogen and methyl;
s is an integer from 2 to 6;
q is an integer from 1 to 5; and
r is an integer from 2 to 10.

10. The sulfur-containing compound of claim 6, wherein the compound having a terminal group that is reactive with a thiol group and a terminal group that promotes adhesion is selected from a vinyl silane, a vinyl phosphonate, a vinyl amine, a vinyl carboxylic acid, and a vinyl phosphonic acid.

11. A composition comprising:
at least one sulfur-containing compound of claim 1;
at least one thiol-terminated sulfur-containing polymer; and
at least one curing agent.

12. The composition of claim 11, wherein the at least one thiol-terminated sulfur-containing polymer is selected from a thiol-terminated polythioether and a thiol-terminated polysulfide.

13. The composition of claim 11, wherein the at least one thiol-terminated sulfur-containing polymer is selected from a thiol-terminated polythioether of Formula (13), a thiol-terminated polythioether of Formula (13a), and a combination thereof:

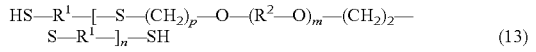

(13)

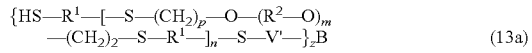

(13a)

wherein:
- each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $-[(-CHR^3-)_s-X-]_q-(-CHR^3-)_r-$, wherein:
  - s is an integer from 2 to 6;
  - q is an integer from 1 to 5;
  - r is an integer from 2 to 10;
  - each $R^3$ is independently selected from hydrogen and methyl; and
  - each X is independently selected from O, S, and —NHR—, wherein R is selected from hydrogen and methyl;
- each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined above;
- m is an integer from 0 to 50;
- n is an integer from 1 to 60;
- p is an integer from 2 to 6;
- B represents a core of a z-valent, vinyl-terminated polyfunctionalizing agent $B(-V)_z$ wherein:
  - z is an integer from 3 to 6; and
  - —V is a moiety comprising a group that is reactive with a thiol group; and
- each —V'— represents a moiety formed by the reaction of —V with a thiol group.

14. The composition of claim 11, wherein the at least one curing agent is selected from an iso-epoxy and an isocyanate.

15. The composition of claim 11, comprising at least one second adhesion promoter.

16. The composition of claim 11, formulated as a sealant.

17. A cured sealant comprising the composition of claim 16.

18. The cured sealant of claim 17, exhibiting 100% cohesive failure.

19. An aperture sealed with a sealant comprising the composition of claim 16.

20. A method of sealing an aperture comprising:
(a) applying a sealant comprising the composition of claim 16 to at least one surface defining an aperture;
(b) assembling the surfaces defining the aperture; and
(c) curing the sealant to provide a sealed aperture.

* * * * *